(12) United States Patent
Pan et al.

(10) Patent No.: US 11,080,569 B2
(45) Date of Patent: Aug. 3, 2021

(54) METHOD AND DEVICE FOR IMAGE PROCESSING, AND COMPUTER STORAGE MEDIUM

(71) Applicant: BEIJING SENSETIME TECHNOLOGY DEVELOPMENT CO., LTD., Beijing (CN)

(72) Inventors: Xingang Pan, Beijing (CN); Jianping Shi, Beijing (CN); Ping Luo, Beijing (CN); Xiaoou Tang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/072,324

(22) Filed: Oct. 16, 2020

(65) Prior Publication Data

US 2021/0034913 A1 Feb. 4, 2021

Related U.S. Application Data

(63) Continuation of application No. PCT/CN2019/077341, filed on Mar. 7, 2019.

(30) Foreign Application Priority Data

May 23, 2018 (CN) .......................... 201810500185.0

(51) Int. Cl.
*G06K 9/62* (2006.01)
*G06K 9/46* (2006.01)
*G06N 3/04* (2006.01)

(52) U.S. Cl.
CPC .............. *G06K 9/629* (2013.01); *G06K 9/46* (2013.01); *G06K 9/6232* (2013.01); *G06N 3/04* (2013.01)

(58) Field of Classification Search
CPC ........ G06K 9/629; G06K 9/46; G06K 9/6232; G06N 3/04
See application file for complete search history.

(56) References Cited

U.S. PATENT DOCUMENTS

2018/0089834 A1* 3/2018 Spizhevoy ............. G06K 9/627
2019/0138838 A1* 5/2019 Liu .......................... G06T 5/002
(Continued)

FOREIGN PATENT DOCUMENTS

CN 107247949 A 10/2017
CN 107657281 A 2/2018
(Continued)

OTHER PUBLICATIONS

Nam et al. "Batch-Instance Normalization for adaptively style-invariant Neural networks" (Year: 2018).*
(Continued)

*Primary Examiner* — Dhaval V Patel
(74) *Attorney, Agent, or Firm* — Cooper Legal Group, LLC

(57) ABSTRACT

A method and device for image recognition and a storage medium are provided. The method includes: a target image is acquired; feature extraction processing is performed on the target image through convolutional layers in a neural network model to obtain feature maps, and Instance Normalization (IN) and Batch Normalization (BN) processing is performed on the feature maps to obtain a recognition result of the target image; and the recognition result of the target image is output.

17 Claims, 6 Drawing Sheets

(56) References Cited

U.S. PATENT DOCUMENTS

2019/0311183 A1* 10/2019 Wang .................. G06K 9/6268
2020/0279354 A1* 9/2020 Klaiman ................ G06N 20/00

FOREIGN PATENT DOCUMENTS

| CN | 107862374 A | 3/2018 |
|----|-------------|--------|
| CN | 107909016 A | 4/2018 |
| CN | 108875787 A | 11/2018 |
| WO | 2016123409 A1 | 8/2016 |
| WO | 2016195496 A2 | 12/2016 |
| WO | 2017149971 A1 | 9/2017 |
| WO | 2018075927 A1 | 4/2018 |

OTHER PUBLICATIONS

Xingang Pan et al. Two at Once: Enhancing Learning and Generalization Capacities via IBN-Net, arXiv:1807.09441v3 [cs.CV] Mar. 23, 2020, 16 pages.
International Search Report and the English Translation in the international application No. PCT/CN2019/077341, dated May 28, 2019, 5 pages.
First Office Action and the English Translation of the Chinese application No. 201810500185.0, dated Aug. 1, 2019, 11 pages.
Second Office Action and the English Translation of the Chinese application No. 201810500185.0, dated Nov. 18, 2019, 7 pages.
Notice of Allowance and the English Translation of the Chinese application No. 201810500185.0, dated Apr. 7, 2020, 4 pages.
First Office Action of the Japanese application No. 2020-543663, dated Apr. 19, 2021, 6 pgs.

* cited by examiner

METHOD AND DEVICE FOR IMAGE PROCESSING, AND COMPUTER STORAGE MEDIUM

CROSS-REFERENCE TO RELATED APPLICATION

This application is a continuation application of PCT Application No. PCT/CN2019/077341, filed on Mar. 7, 2019, which claims priority to Chinese Patent Application No. 201810500185.0, filed on May 23, 2018. The content of PCT Application No. PCT/CN2019/077341 and the content of Chinese Patent Application No. 201810500185.0 are hereby incorporated by reference in their entireties.

TECHNICAL FIELD

Embodiments of the disclosure relate to the field of deep learning, and relate to, but not limited, a method and device for image recognition, a computer device and a storage medium.

BACKGROUND

Convolutional Neural Network (CNN) has become a mainstream method in the field of computer vision. For image understanding tasks such as image classification, object detection and semantic segmentation, training of all existing mainstream CNNs such as a Visual Geometry Group (VGG), a Residual Network (ResNet) and a Dense Convolutional Network (DenseNet) is accelerated by use of Batch Normalization (BN). However, these CNNs have relatively poor robustness for changes in image appearances. For example, when an image changes in color, contrast, style, scene and the like, the performance of these CNNs is significantly reduced.

In addition, in the domain of image appearance conversion, Instance Normalization (IN) is adopted for a CNN to improve the adaptability of the CNN to images with different appearances. However, IN has not been successfully adopted for image understanding tasks. Moreover, in the related arts, no matter whether BN or IN is adopted for a CNN, the performance of the CNN is not well improved.

SUMMARY

The embodiments of the disclosure provide a method and device for image recognition, a computer device and a storage medium.

The technical solutions of the embodiments of the disclosure are implemented as follows.

In a first aspect, the embodiments of the disclosure provide a method for image recognition, which includes the following operations.

A target image is acquired.

Feature extraction processing is performed on the target image through convolutional layers in a neural network model to obtain feature maps, and Instance Normalization (IN) and Batch Normalization (BN) processing is performed on the feature maps to obtain a recognition result of the target image.

The recognition result of the target image is output.

In a second aspect, the embodiments of the disclosure provide a device for image recognition, comprising a processor and a memory configured to store program instructions that, when executed by the processor, cause the processor to perform a method for image recognition comprising: acquiring a target image; performing feature extraction processing on the target image through convolutional layers in a neural network model to obtain feature maps, and performing IN and BN processing on the feature maps to obtain a recognition result of the target image; and outputting the recognition result of the target image.

In a third aspect, the embodiments of the disclosure provide a non-transitory computer-readable storage medium, having stored thereon computer-executable instructions that, when executed by a processor, cause the processor to perform a method for image recognition comprising: acquiring a target image; performing feature extraction processing on the target image through convolutional layers in a neural network model to obtain feature maps, and performing Instance Normalization (IN) and Batch Normalization (BN) processing on the feature maps to obtain a recognition result of the target image; and outputting the recognition result of the target image.

In a fourth aspect, the embodiments of the disclosure provide a method for image recognition, which includes the following operations.

An image to be recognized is acquired.

The image to be recognized is input into a neural network model obtained through training to obtain a recognition result of the image to be recognized, here, the neural network model is obtained by performing IN and BN processing on feature maps output by convolutional layers in a neural network.

The recognition result of the image to be recognized is output.

In a fifth aspect, the embodiments of the disclosure provide a device for image recognition, which includes a first acquisition module, a first processing module and a first output module.

The first acquisition module is configured to acquire an image to be recognized.

The first processing module is configured to input the image to be recognized into a neural network model obtained through training to obtain a recognition result of the image to be recognized, here, the neural network model is obtained by performing IN and BN processing on a neural network.

The first output module is configured to output the recognition result of the image to be recognized.

In a sixth aspect, the embodiments of the disclosure provide a computer program product, which includes computer-executable instructions that, when executed, implement the method for image recognition provided in the embodiments of the disclosure.

In a seventh aspect, the embodiments of the disclosure provide a computer storage medium, which stores computer-executable instructions that, when executed, implement the method for image recognition provided in the embodiments of the disclosure.

In an eighth aspect, the embodiments of the disclosure provide a computer device, which includes a memory and a processor. The memory is configured to store computer-executable instructions. The processor is configured to run the computer-executable instructions in the memory to implement the method for image recognition provided in the embodiments of the disclosure.

In a ninth aspect, the embodiments of the disclosure provide a computer program product, which includes computer-executable instructions that, when executed, implement the method for image recognition provided in the embodiments of the disclosure.

DETAILED DESCRIPTION

Figure 1A:
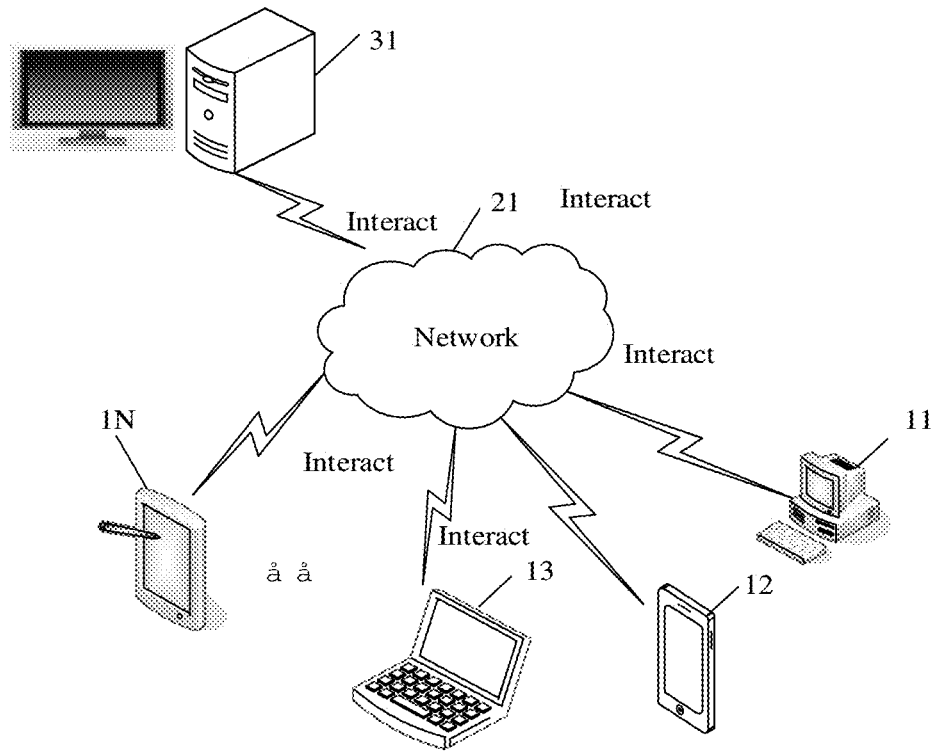
FIG. 1A is a composition structure diagram of a network architecture according to an embodiment of the disclosure.

The embodiments of the disclosure provide a network architecture. FIG. 1A is a composition structure diagram of a network architecture according to an embodiment of the disclosure. As illustrated in FIG. 1A, the network architecture includes two or more computer devices 11 to 1N and a server 31. The computer devices 11 to 1N interact with the server 31 through a network 21. The computer device may be various types of computing devices with an information processing capability in an implementation process. For example, the computer device may include a mobile phone, a tablet computer, a desktop computer, a personal digital assistant, a navigator, a digital phone and a television. The embodiments of the disclosure provide a method for image recognition, so that the problem that structural information of an output image changes relative to an input image may be effectively solved. The method is applied to a computer device. A function realized by the method may be realized by calling program codes through a processor in the computer device. Of course, the program codes may be stored in a computer storage medium. It can be seen that the computer device at least includes the processor and the storage medium.

For better understanding the embodiments of the disclosure, technical terms related to the neural network are explained herein. The term 'channel' has two different meanings: the first is that, for a sample image (i.e., the image is taken as a training sample), a channel means a color channel, and the color channel is adopted to represent the channel of the sample image in the following; and the second indicates a dimension of an output space, for example, the number of output channels in a convolution operation or the number of convolution kernels in each convolutional layer.

Color channel: an image is decomposed into one or more color elements or color components. Single color channel: a pixel requires only one numerical value to represent a grayscale, and 0 represents black. Three color channels: if a Red Green Blue (RGB) color mode is adopted, the image is divided into three color channels, i.e., red channel, green channel and blue channel, for representing colors, and if the three values are all 0, it represents black. Four color channels: on the basis of the RGB color mode, an alpha channel is added and represents transparency, and alpha=0 represents full transparency. CNN is a multilayer supervised learning neural network, and convolutional layers and pooling layers of hidden layers are core modules for realizing a feature extraction function of the CNN. Low hidden layers of the CNN include convolutional layers and maximum pooling layers that are alternately arranged, and a high layer is a fully connected layer corresponding to a hidden layer and a logistic regression classifier of a traditional multilayer perceptron. An input of the first fully connected layer is a feature image obtained by feature extraction of convolutional layers and sub-sampling layers. The last layer, i.e., an output layer, is a classifier capable of classifying the input image by use of logistic regression, Softmax regression or even a support vector machine. Each layer in the CNN consists of multiple maps, each map consists of multiple neurons, and all the neurons in the same map share a convolution kernel (i.e., weight). A convolution kernel usually represents a feature. For example, if a certain convolution kernel represents an arc, a convolution operation is performed on the whole image through the convolution kernel, and a region with a relatively large convolution value is very likely an arc. In a CNN, convolutional layers and pooling layers are usually alternately arranged, namely a convolutional layer is connected with a pooling layer, and another convolutional layer is connected after the pooling layer. Of course, multiple convolutional layers may be connected with a pooling layer, and in such case, the convolutional layers extract and combine features to form more abstract features to finally form descriptive features of an image object; and in the CNN, a fully connected layer may further be connected after the pooling layer. Rectified Linear Unit (ReLU) function: a formula thereof is ReLU(x)=max(0, x). It can be seen from a graph of the ReLU function that, compared with other activation function such as the sigmoid function, the ReLU function has three major changes: ① unilateral suppression; ② relatively wide activation border; and ③ sparse activation. VGG model: the VGG model is simple and effective in structure, 3×3 convolution kernels are only adopted in the first few layers to increase the network depth, the number of neurons in each layer is sequentially reduced by max pooling, and the last three layers are two fully connected layers with 4,096 neurons and a softmax layer. "16" and "19" represent the layer number of convolutional layers and fully connected layers in the network that are required to update weight (the weight is a parameter to be learned), and weights of both a VGG16 model and a VGG19 model are obtained by training with the ImageNet.

Figure 1B:
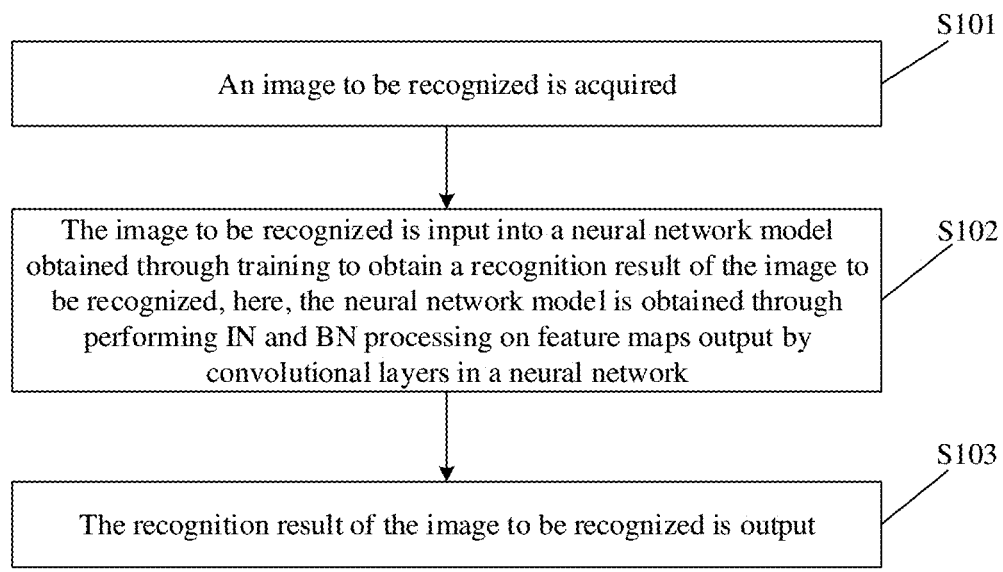
FIG. 1B is a flowchart of a method for image recognition according to an embodiment of the disclosure.

The embodiments of the disclosure provide a method for image recognition. FIG. 1B is a flowchart of the method for image recognition according to an embodiment of the disclosure. As illustrated in FIG. 1B, the method includes the following operations.

In S101, an image to be recognized is acquired. Here, the image to be recognized may be called a target image. Herein, S101 may be implemented by a computer device. Furthermore, the computer device may be an intelligent terminal. For example, the computer device may be a mobile terminal device with a wireless communication capability such as a mobile phone (for example, a cellphone), a tablet computer or a notebook computer; or may be an immobile intelligent terminal device such as a desktop computer. The computer device is configured for image recognition or processing.

In the embodiment, the image to be processed may be an image with a complex appearance, or may be an image with a simple appearance.

In S102, the image to be recognized is input into a neural network model obtained through training to obtain a recognition result of the image to be recognized. Herein, S102 may be implemented by the computer device. The neural network model is obtained by performing IN and BN processing on feature maps output by convolutional layers in a neural network. In the embodiment, IN and BN processing is performed on the feature maps output by the convolutional layers in the neural network to obtain the neural network model, i.e., an IBN-Net. The recognition result may be a type of the image, a name of the image or the like. The neural network may be a CNN, such as, ResNet50, VGG and DenseNet. Both IN and BN are adopted for the neural network model, IN introduces appearance invariance and improves generalization, and BN retains the discriminative features of content information. Therefore, for the neural network model that adopts the combination of IN and BN, not only the generalization capability of the neural network may be improved, but also the image recognition accuracy of the neural network may be improved.

In S103, the recognition result of the image to be recognized is output. Herein, S103 may be implemented by the computer device. In a practical implementation process, the computer device, when outputting an analysis result of the image to be recognized, may output the image to be recognized on its own display, or the computer device may output the analysis result to another device, i.e., sending the analysis result to the another device. For example, the another device may be an intelligent terminal of a user.

In the method for image recognition provided in the embodiment of the disclosure, the combination of IN and BN is applied to the neural network, and then the image to be recognized is analyzed with the neural network model obtained through IN and BN processing, so that the image recognition accuracy is effectively improved.

In the implementation process, the trained neural network model may be in the computer device locally or may be at a server side.

Figure 1C:
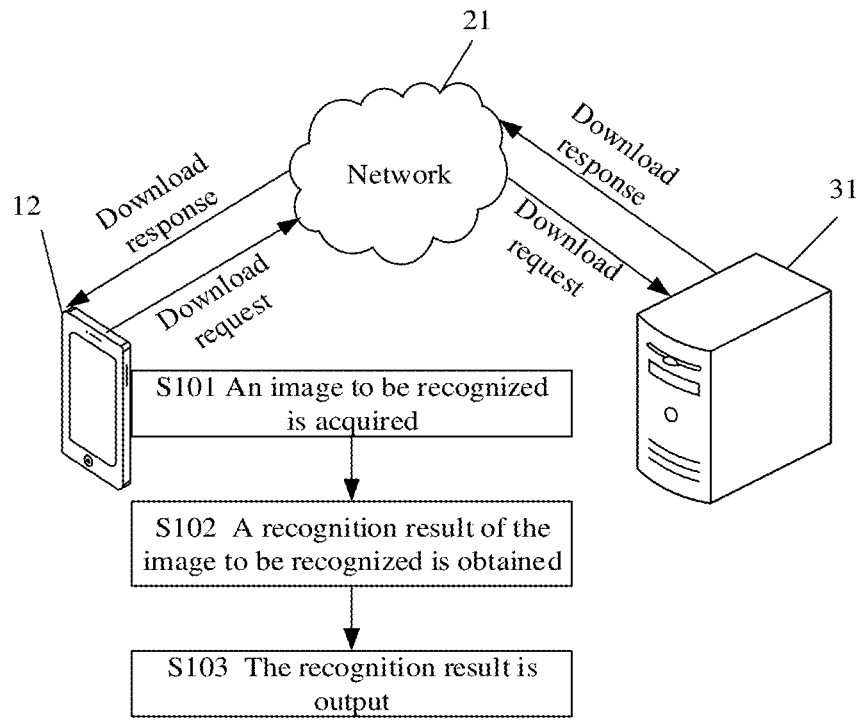
FIG. 1C is a diagram of a network architecture implementing a method for image recognition according to an embodiment of the disclosure.

When the trained neural network model is in the computer device locally, the trained neural network model may be installed when a client program is installed in the computer device. In such case, referring to FIG. 1C, the computer device acquires the image to be recognized through S101, then obtains the recognition result of the image to be recognized through S102 and finally outputs the recognition result through S103. It can be seen from the above process that after the client program is installed in the computer device, S101 to S103 are all locally executed in the computer device, and finally, the computer device outputs the obtained recognition result to the user.

Figure 1D:
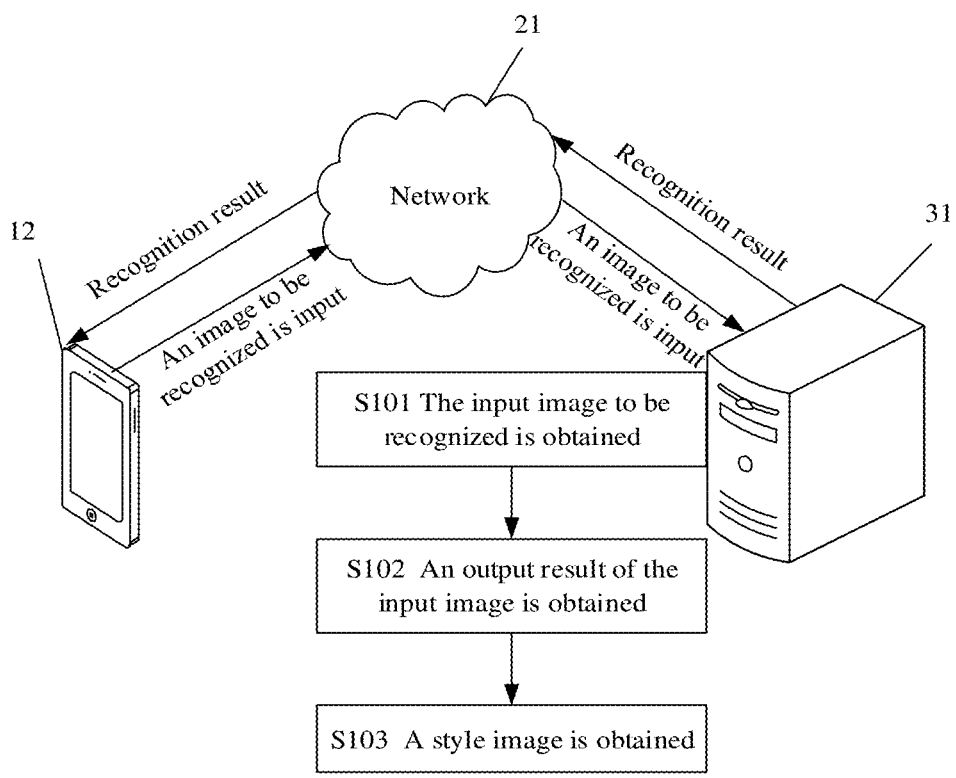
FIG. 1D is another diagram of a network architecture implementing a method for image recognition according to an embodiment of the disclosure.

In some embodiments, the trained neural network model may also be at the server side. Referring to FIG. 1D, the computer device sends an input image to the server, and the server receives the input image sent by the computer device. In such case, the server implements S101. In other words, if the method is implemented at the server side, S101 includes that: the server receives the input image sent by the computer device, namely the server determines the image to be recognized. Then, the server obtains an output result of the image to be recognized through S102 and finally obtains the output recognition result through S103. It can be seen from the above process that S101 to S103 are all executed at the server side. Finally, the server may further send the recognition result to the computer device, and the computer device, after receiving the recognition result, outputs the recognition result to the user. In the embodiment, after the client program is installed in the computer device, the user uploads the image to be recognized of the user, the recognition result of the image to be recognized sent by the server is received, and the recognition result is output to the user.

Figure 2:
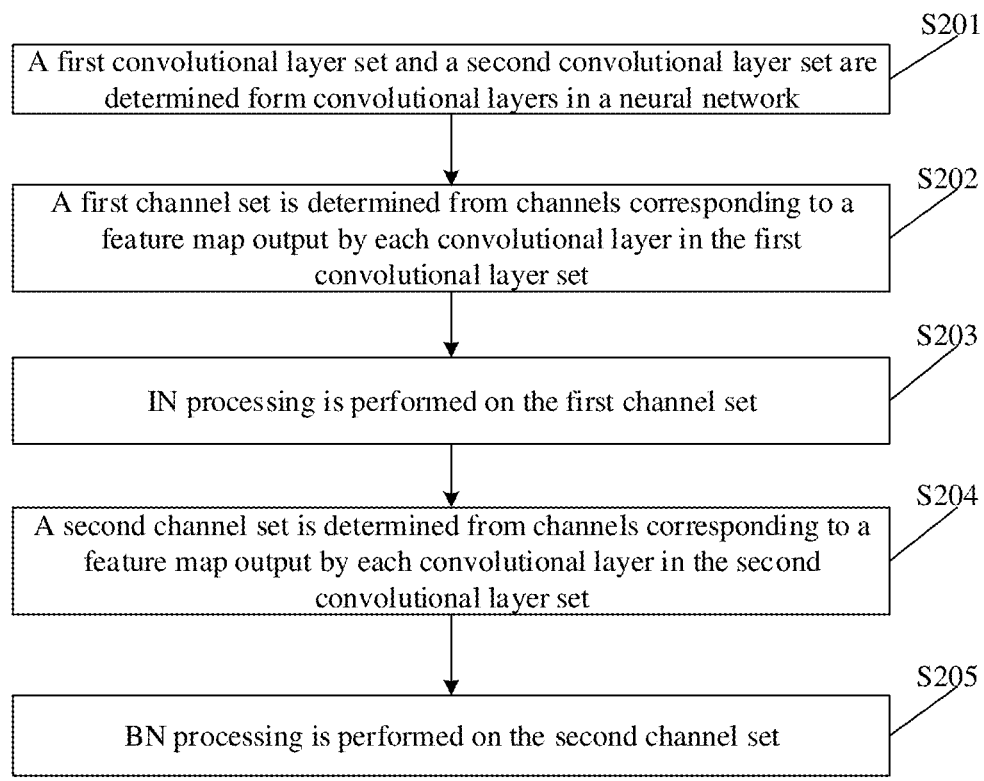
FIG. 2 is another flowchart of a method for image recognition according to an embodiment of the disclosure.

The embodiment of the disclosure provides a method for image recognition. FIG. 2 is another flowchart of the method for image recognition according to an embodiment of the disclosure. As illustrated in FIG. 2, the method includes the following operations.

In S201, a first convolutional layer set and a second convolutional layer set are determined from convolutional layers in the neural network. Herein, a set formed by the first convolutional layer set and the second convolutional layer set includes all or part of the convolutional layers in the neural network. The set formed by the first convolutional layer set and the second convolutional layer set includes all the convolutional layers in the neural network, which can be understood as that at least one of IN processing or BN processing is performed on all the convolutional layers in the neural network. The set formed by the first convolutional layer set and the second convolutional layer set includes part of the convolutional layers in the neural network, which can be understood as that, IN processing, or, processing of IN in combination with BN is not performed on part of the convolutional layers in the neural network.

In S202, a first channel set is determined from channels corresponding to a feature map output by each convolutional layer in the first convolutional layer set. Herein, the first channel set includes all or part of the channels corresponding to the feature map output by each convolutional layer in the first convolutional layer set. The first convolutional layer set does not include the last convolutional layer of the neural network, that is, IN processing is not performed on the last layer (deep layer) of the neural network, so that diminution in the contents discrimination in deep features is avoided, feature changes caused by image appearance changes may also be reduced, and furthermore, the image recognition accuracy of the neural network model is improved. In a practical using process, IN processing is usually performed on one half of all the channels corresponding to the feature map and BN processing is performed on the other half of all the channels corresponding to the feature map. It is apparent that the proportion of the channels on which IN processing is performed may be regulated. In the embodiment, for making an identity path of the neural network relatively clean, IN processing is not performed on the identity path of the neural network.

In S203, IN processing is performed on the first channel set. Herein, if the first channel set includes all the channels corresponding to the feature map output by each convolutional layer in the first convolutional layer set, IN processing is performed on all the channels corresponding to the feature map output by each convolutional layer in the first convolutional layer set. If the first channel set includes part of all the channels corresponding to the feature map output by each convolutional layer in the first convolutional layer set, IN processing is performed on the part of all the channels, and BN processing is performed on the remaining channels, or no processing is performed on the remaining channels.

In S204, a second channel set is determined from channels corresponding to a feature map output by each convolutional layer in the second convolutional layer set. Herein, the second channel set includes all or part of the channels corresponding to the feature map output by each convolutional layer in the second convolutional layer set.

In S205, BN processing is performed on the second channel set. Herein, if the second channel set includes all the channels corresponding to the feature map output by each convolutional layer in the second convolutional layer set, BN processing is performed on all the channels corresponding to the feature map output by each convolutional layer in the second convolutional layer set. If the second channel set includes part of all the channels corresponding to the feature map output by each convolutional layer in the second convolutional layer set, BN processing is performed on the part of all the channels, and IN processing is performed on the remaining channels.

In some embodiments, a relationship between the first convolutional layer set and the second convolutional layer set includes the following three conditions. A first condition: the first convolutional layer set is disjoint from the second convolutional layer set. That is, different normalization processing is performed on the first convolutional layer set and the second convolutional layer set respectively, i.e., IN processing is performed on the feature map output by each convolutional layer in the first convolutional layer set, and BN processing is performed on the feature map output by each convolutional layer in the second convolutional layer set. As illustrated in FIG. 4(b), IN processing is performed on only part of an output result obtained by a summation operation, and BN processing is performed on the feature maps output by other convolutional layers. A second condition: the first convolutional layer set is intersected with the second convolutional layer set. That is, IN processing and processing of IN in combination with BN are performed on the first convolutional layer set, and BN processing and processing of IN in combination with BN are performed on the second convolutional layer set. That is, as described in S202 and S203, if the first channel set includes part of all the channels corresponding to the feature map output by each convolutional layer in the first convolutional layer set, IN processing is performed on the part of all the channels, and BN processing is performed on the remaining part. Or, as described in S204 and S205, if the second channel set includes part of all the channels corresponding to the feature map output by each convolutional layer in the second convolutional layer set, BN processing is performed on the part of all the channels, and IN processing is performed on the remaining part. As illustrated in FIG. 4(d), BN processing and processing of IN in combination with BN processing are performed on the feature maps output by the convolutional layers. A third condition: the second convolutional layer set is a subset of the first convolutional layer set. If the second convolutional layer set is a proper subset of the first convolutional layer set, IN processing and processing of IN in combination with BN are performed on the first convolutional layer set, and processing of IN in combination with BN is performed on the second convolutional layer set. If the second convolutional layer set is the same as the first convolutional layer set, processing of IN in combination with BN is performed on both the second convolutional layer set and the first convolutional layer set. That is, the first channel set includes part of all the channels corresponding to the feature map output by each convolutional layer in the first convolutional layer set, IN processing is performed on the part of all the channels, and BN processing is performed on the remaining part or no processing is performed on the remaining part (namely two processing manners are adopted for the first convolutional layer set: IN processing, and processing of IN in combination with BN).

Figure 3:
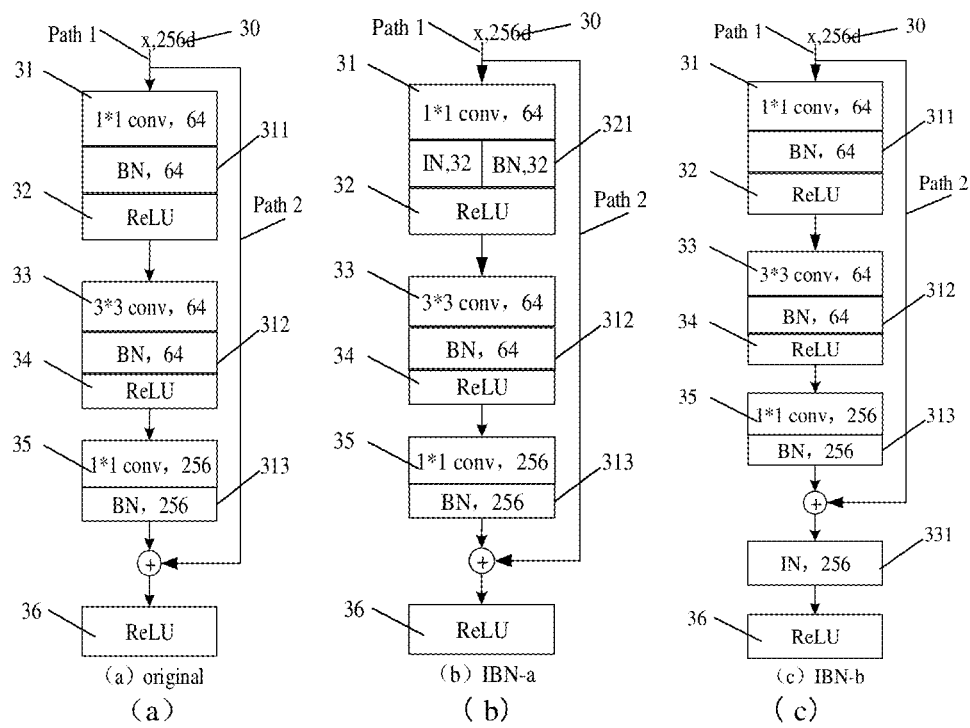
FIG. 3 is a ResNet-based composition structure diagram according to an embodiment of the disclosure.

In some embodiments, the method further includes that: feature maps corresponding to two blocks of the neural network are summed to obtain an output result, and IN processing is performed on the output result. As illustrated in FIG. 3(c), a feature map obtained by processing a residual block presented in FIG. 3(c) through three convolutional layers and a feature map obtained by processing a previous residual block through multiple convolutional layers are summed to obtain a summation result (i.e., an output result), and then IN processing is performed on the summation result. In the embodiment, appearance information may be kept in a residual path or may be preserved in the identity path. Therefore, for improving the generalization capability of the neural network more effectively, IN processing is performed after the residual path (i.e., path 1 in FIG. 3) and the identity path (i.e., path 2 in FIG. 3) are converged, so that the image recognition accuracy is effectively improved.

Unlike a CNN structure adopting one of IN and BN in the related arts, in the method for image recognition provided in the embodiments of the disclosure, the learning capabilities of IN and BN are deeply researched to implement combined use of IN and BN for the same CNN. For example, in many advanced deep architectures, BN is adopted as a key component for improving their learning capabilities in high-level visual tasks, and IN is usually combined with a CNN to eliminate variances of images in low-level visual tasks, for example, image style transformation. However, there is yet drawn no conclusion about different characteristics of learned features of IN and BN and the influence of the combination thereof in the related arts. On the contrary, an IBN-Net provided in the embodiments of the disclosure indicates that a combination of IN and BN in an appropriate manner will improve the learning and generalization capabilities of the CNN. In the IBN-Net, a feature of the combination of IN and BN is retained in a shallow layer of the CNN, and a feature of BN is retained in a high layer of the CNN, so as to conform to statistical features under different depths of the network. In the CNN, information related to an appearance of an image (for example, a color, a contrast and a style) mainly exists in the features of the shallow layer, while information related to an object class in the image mainly exists in the features of the deep layer and still exists in the features of the shallow layer. Based on this, IN layers are introduced to the CNN according to two rules. The first rule is that, in order to avoid interference to content discrimination in the deep layers while reducing a feature change caused by the appearance in the shallow layer, IN layers are added to the low layers of the CNN only. The second rule is that, for avoiding loss of image content information in the shallow layer, one half of the features in original BN layers are replaced with IN layers, and BN layers are still adopted for the other half of the features. Based on this, the combination of BN and IN is adopted for processing in the CNN to form the IBN-Net, as provided in the embodiments of the disclosure.

The IBN-Net provided in the embodiments of the disclosure is adopted for the CNN, which has the following advantages.

First: through the IBN-Net proposed in the embodiments of the disclosure, the performance and generalization capability of the CNN are improved. For example, when IBN-Net50 and ResNet50 have similar numbers of parameters and similar calculation costs, the accuracy that the precision of the IBN-Net50 on an original validation set of the image network database (ImageNet) reaches the fifth place and the first place is 93.7% and 77.4% respectively, 0.8% and 1.7% higher than a validation rate of the ResNet50 respectively.

The accuracy that the precision of the IBN-Net50 on a new validation set of the ImageNet after style transformation reaches the fifth place and the first place is 72.9% and 48.9% respectively, 2.2% and 2.9% higher than the validation rate of the ResNet50 respectively.

Second: in the IBN-Net proposed in the embodiments of the disclosure, IN provides visual and appearance invariance, and meanwhile, BN may accelerate training and retain the discriminative features. This characteristic is favorable for designing a system structure of the IBN-Net, where IN is arranged in the shallow layer to eliminate the appearance change, and the intensity of IN in the deep layer should be reduced for maintaining the discriminativeness. The IBN-Net module may be configured to redevelop multiple deep architectures that are being researched recently to improve the learning and generalization capabilities of the deep architectures with the calculation costs of the deep architectures kept unchanged. For example, when the IBN-Net is used for VGG16, ResNet101, ResNeXt101 and Squeeze-and-Excitation Residual Network (SE-ResNet101), the accuracy that the precision of VGG16, ResNet101, ResNeXt101 and SE-ResNet101 on the validation set of the ImageNet reaches the first place is higher than 0.8%, 1.1%, 0.6% and 0.7% of respective original versions.

Third: the cross-domain performance is remarkably improved by the IBN-Net. For example, a traffic-scene-based real dataset and a virtual dataset belong to two image domains. The real dataset may be Cityscapes, and the virtual dataset may be Cityscapes Grand Theft Auto (GTA). Under the condition of training on GTA and testing on Cityscapes, the performance of the ResNet50 integrated with the IBN-Net is improved by 7.6%. When a model pre-trained by GTA is adopted for fine tuning on Cityscapes, the number of required samples is also remarkably reduced. For example, when only 30% of training data of Cityscapes is adopted for fine tuning, the segmentation accuracy of the IBN-Net model provided in the embodiments of the disclosure reaches 65.5%, while the segmentation accuracy of the ResNet50 adopting all training data for fine tuning is only 63.8%.

For better understanding the embodiments of the disclosure, four aspects related to the IBN-Net are provided here: the invariance in the CNN, the network system structure of the CNN, a domain adaptation method and a scene understanding method. The invariance in the CNN: the module proposed in the related arts is usually for improving the modeling capability of the CNN, or reducing over-fitting to enhance the generalization capability of the CNN in a single domain. In these methods, specific invariance is usually introduced to the system structure of the CNN to achieve the abovementioned objective. For example, max pooling and deformable convolution introduce space invariance to the CNN, thereby improving the robustness of the CNN for spatial changes (for example, affine, distortion and viewpoint transformation). The function of dropout and BN in training may be considered as regularizers to reduce the influence of sample noises. For the image appearance, a simple appearance change such as color and brightness deviations may be eliminated by normalizing each RGB channel of the image through averages and standard deviations. For a more complex appearance change such as a style change, recent researches find that the information may be coded in the average and variance of the feature map. Therefore, the IN layer presents the potential of eliminating such appearance differences. The network system structure of the CNN: the architecture of the CNN has experienced many development stages since the CNN presents performance higher than that of the conventional method. The ResNet is used most intensively, and the ResNet alleviates difficulties in training of an extraordinarily deep network through a shortcut. Thereafter, many variations of the ResNet are successively proposed. Compared with the ResNet, ResNeXt usually increases the "cardinality" of the ResNet to improve the model performance, which is implemented by group convolution. In practice, increasing the cardinality may prolong the running time of a deep learning framework. In addition, the Squeeze-and-Excitation Network (SENet) introduces an attention mechanism of a channel dimension into the ResNet. Compared with the ResNet, the SENet achieves higher performance on the ImageNet, but also increases network parameters and the calculation amount. A recently proposed Densely Connected Networks (DenseNet) replaces the shortcut of the ResNet with concatenation. The DenseNet is proved to be more effective than the ResNet. However, there are two limitations to the above system structure of the CNN. First, finite basic modules restrain the CNN from achieving a more attractive attribute. For example, all these system structures are formed by convolution, BN, a ReLU and a shared pool, and the only difference of different CNNs is how these modules are organized. However, compositions of these layers are intrinsically easily influenced by appearance changes. Second, a design objective of these models is to achieve high performance in a single task in a single domain, but generalization of these models to a new domain is still limited. In the domain of image style transformation, IN is adopted to help to eliminate the image contrast in some methods. However, invariance of the image appearance is yet not successfully introduced to the CNN, particularly to high-level tasks such as image classification or semantic segmentation. This is because IN drops useful content information in the features, which influences the performance of the model. The domain adaptation method: how to alleviate performance decline caused by biases between different domains is an important problem. A natural method is to use transfer learning, for example, fine tuning the model in a target domain. However, this requires manually annotated results of the target domain, and when the network model is applied to a source domain, the performance of the fine-tuned model may be reduced. In many domain adaptation methods, the statistical data of the target domain is adopted to promote adaptation. A well-designed loss function such as Maximum Mean Discrepancy (MMD), Correlation Alignment (CORAL) and Adversarial Loss (AL) is usually required to reduce feature differences caused by biases of two domains to alleviate the problem of performance decline. Transfer learning and domain adaptation have two main limitations. First, it is difficult to obtain the statistical information of the target domain during a practical application. It is also difficult to collect data of all possible scenes in the target domain. Second, in most of the most advanced methods, different models are adopted for the source domain and the target domain to improve the performance. However, the ideal condition is that one model may be adapted to all domains.

Another paradigm for this problem is domain generalization, and the objective thereof is to acquire knowledge from many related source domains for application to a new target domain of which statistical data is unknown during training. In the related arts, an algorithm is usually designed to capture common factors in different domains. However, during the practical application, it is usually difficult to collect data of the multiple related source domains, and the final performance highly depends on a series of source domains that are collected. In this work, the new CNN system structure IBN-Net with appearance invariance is designed in the embodiments of the disclosure to improve the performance and generalization capability of the model. Unlike domain adaptation and domain generalization, the disclosure requires no target domain data or related source domains. The embodiments of the disclosure are very helpful for the condition that the data of the target domain cannot be obtained, and this cannot be achieved in the related arts.

In the embodiments of the disclosure, for a BN-based CNN, information related to an appearance of an image (a color, a contrast and a style) mainly exists in a feature of a shallow layer, while information related to an object class in the image mainly exists in a feature of a deep layer and still exists in the feature of the shallow layer. Therefore, IN is introduced according to two rules in the embodiments of the disclosure. First, for not diminishing the content discrimination of the image in the features of the deep layer, IN will not be added to last one or more layers of the CNN. Second, for still preserving the content information in the shallow layer, BN processing is performed on part of features in the shallow layer.

In the embodiments of the disclosure, the IBN-Net is applied to the ResNet. FIG. 3 is a ResNet-based composition structure diagram according to an embodiment of the disclosure. The ResNet is mainly formed by four groups of residual blocks. FIG. 3(a) is a structure diagram of a residual block in an original ResNet. FIG. 3(b) and FIG. 3(c) are structure diagrams of performing processing of IN in combination with BN on feature maps output by different convolutional layers in the ResNet. In FIG. 3(a), path 1 is a residual path, and path 2 is an identity path; x in (x, 256d) indicated by 30 represents an input feature, and 256d represents that the input feature corresponds to 256 channels; 31 represents a 64-channel convolutional layer of which a convolution kernel is 1*1; 32, 34 and 36 represent ReLUs; 33 represents a 64-channel convolutional layer of which a convolution kernel is 3*3; 35 represents a 256-channel convolutional layer of which a convolution kernel is 1*1; 311 represents that BN is performed on 64 channels; 312 represents that BN is performed on 64 channels; and 313 represents that BN is performed on 256 channels. In FIG. 3(b), 321 represents that IN processing is performed on one half (i.e., 32 channels) of channels corresponding to a feature map output by the convolutional layer and BN processing is performed on the other half (i.e., the remaining 32 channels). In FIG. 3(c), 331 represents that IN processing is performed on a result obtained by a summation operation, the summation operation is to sum a feature map obtained by processing a residual block presented in FIG. 3(c) through three convolutional layers and a feature map (i.e., the input feature x) obtained by processing a previous residual block through multiple convolutional layers, in the ResNet. For a residual block, for utilizing the generalization potential of IN, in a feature map obtained after a first convolutional layer, BN is performed on one half of channels corresponding to the feature map, and IN is performed on the other half of channels, as illustrated in FIG. 3(b). There are three reasons for such processing. First, a clean identity path is crucial to optimization of the ResNet, so that IN is added to the residual path rather than the identity path. Second, a residual function F(x, {$W_i$}) in a residual learning function y=F(x, {$W_i$})+x is aligned with x in the identity path in a learning process, so IN is applied to a first normalization layer (i.e., the feature map output by the first convolutional layer) rather than the last one to reduce the probability that F(x,{$W_i$}) is misaligned with x in the identity path. Third, in the feature map output by the convolutional layer, BN processing is performed on a half of the channels and IN processing is performed on the other half of the channels, so that the requirement of preserving the content information of the image in the shallow layer is met.

Such a design is made for a pursuit of the model performance. On one hand, IN may enable the model to learn the appearance invariance features, so that images with high appearance diversity in a dataset may be utilized better. On the other hand, IN is appropriately added, so that information related to the content may be retained well. In the embodiment, the model is represented as IBN-Net-a. In addition, the disclosure also discloses another network IBN-Net-b pursuing a maximum generalization capability. Since the appearance information may be retained in the residual path or may be preserved in the identity path, for ensuring the generalization capability of the neural network, IN is added immediately after the sum operation, as illustrated in FIG. 3(c). For avoiding performance degradation of the ResNet, only three IN layers are added after the first convolutional layer and the first two convolutional groups in the embodiment.

Table 1.1 illustrates overall network structures of original ResNet50 and two IBN-Nets corresponding to the original ResNet50. It can be seen from Table 1.1 that compared with the original ResNet50, first three groups of modules (conv2_x to conv4_x) in the IBN-Net50-a are replaced with the structure of the IBN-a in FIG. 3(b), while the last residual block of each group of modules in first two groups of modules (conv2_x to conv3_x) in the IBN-Net50-b is replaced with the structure of IBN-b in FIG. 3(c), and BN after the first convolutional layer conv1 is replaced with IN. In Table 1.1, conv2_x represents a first group of residual blocks.

TABLE 1.1

Overall Network Structures of Original ResNet50 and Two IBN-Nets Corresponding to the Original ResNet50

| Different layers | Configuration | Normalization type | | |
|---|---|---|---|---|
| | | ResNet50 | IBN-Net50-a | IBN-Net50-b |
| Convolutional layer 1 | 7 × 7, 64, Strider 2 | BN | BN | IN |
| Pooling layer | 3*3 Max pool, Strider 2 | — | — | — |
| conv2_x | $\begin{bmatrix} 1\times1, 64 \\ 3\times3, 64 \\ 1\times1, 256 \end{bmatrix} \times 3$ | BN | IBN-a | BN processing is performed on the first and second residual blocks, and the third residual block is processed based on the IBN-b model |

TABLE 1.1-continued

Overall Network Structures of Original ResNet50 and Two IBN-Nets Corresponding to the Original ResNet50

| Different layers | Configuration | Normalization type | | |
|---|---|---|---|---|
| | | ResNet50 | IBN-Net50-a | IBN-Net50-b |
| conv3_x | $\begin{bmatrix} 1\times1, 128 \\ 3\times3, 128 \\ 1\times1, 512 \end{bmatrix} \times 4$ | BN | IBN-a | BN processing is performed on the first three residual blocks, and the fourth residual block is processed based on the IBN-b model |
| Conv4_x | $\begin{bmatrix} 1\times1, 256 \\ 3\times3, 256 \\ 1\times1, 1,012 \end{bmatrix} \times 6$ | BN | IBN-a | BN |
| Conv5_x | $\begin{bmatrix} 1\times1, 512 \\ 3\times3, 512 \\ 1\times1, 2,048 \end{bmatrix} \times 3$ | BN | BN | BN |
| Classifier | Average pooling, 1000-dimension fully connected layer | — | — | — |

Figure 4:
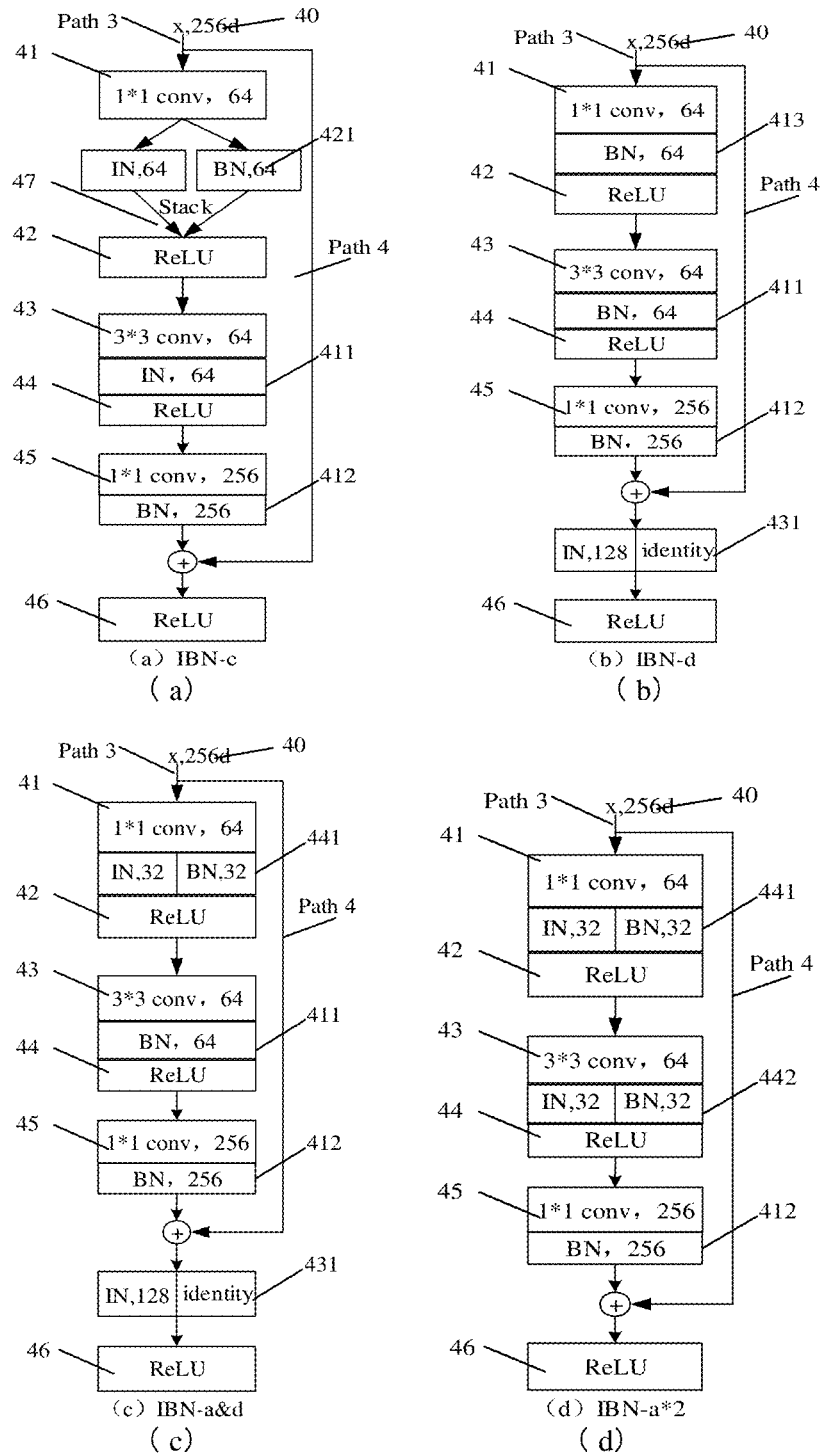
FIG. 4 is another ResNet-based composition structure diagram according to an embodiment of the disclosure.

The two IBN-Nets above are not the only methods for using IN and BN in the CNN. The embodiments of the disclosure provide some interesting variations, as illustrated in FIG. 4. FIG. 4 is another ResNet-based composition structure diagram according to an embodiment of the disclosure. FIGS. 4(a), 4(b), 4(c) and 4(d) are structure diagrams of the same block in a residual neural network. As illustrated in FIGS. 4(a), 4(b), 4(c) and 4(d), processing of IN in combination with BN is performed on feature maps (i.e., normalization layers) output by different convolutional layers in the residual neural network. In FIG. 4(a), path 3 is a residual path, and path 4 is an identity path; x in (x, 256d) indicated by 40 represents an input feature, and 256d represents that the input feature corresponds to 256 channels (which may be understood as 256 images); 41 represents a 64-channel convolutional layer of which a convolution kernel is 1*1; 42, 44 and 46 represent ReLUs; 43 represents a 64-channel convolutional layer of which a convolution kernel is 3*3; 45 represents a 256-channel convolutional layer of which a convolution kernel is 1*1; 411 represents that BN is performed on 64 channels; 412 represents that BN is performed on 256 channels; 421 represents that IN processing and BN processing are performed on the feature map output by a first convolutional layer respectively; and 47 represents that a concatenation operation is executed on results obtained by the two normalization processing manners and then a result through the concatenation operation is output to a next layer, i.e., the ReLU. In FIG. 4(b), 413 represents that BN is performed on the 64 channels; 431 represents that IN processing is performed on a half of a result obtained by a summation operation (namely IN processing is performed on 128 channels in the 256 channels), the summation operation is to sum a feature map obtained by processing the block of the neural network presented in FIG. 4(b) through three convolutional layers and a feature map obtained by processing a previous block of the neural network through multiple convolutional layer, in the CNN. In FIG. 4(c), 441 represents that IN processing is performed on one half (i.e., 32 channels) of the channels corresponding to the feature map output by the first convolutional layer and BN processing is performed on the other half (i.e., the remaining 32 channels). In FIG. 4(d), 442 represents that IN processing is performed on one half (i.e., 32 channels) of channels corresponding to the feature map output by a second convolutional layer and BN processing is performed on the other half (i.e., the remaining 32 channels).

TABLE 1.2

Overall Structures of Original VGG16 and IBN-Net Version Thereof

| Different layer | Normalization type | |
|---|---|---|
| | VGG16 | IBN-VGG16-a |
| Conv3-64 | BN-64 | IN-32, BN-32 |
| Conv3-64 | BN-64 | BN-64 |
| Max pooling | — | — |
| Conv3-128 | BN-128 | IN-64, BN-64 |
| Conv3-128 | BN-128 | BN-128 |
| Max pooling | — | — |
| Conv3-256 | BN-256 | IN-128, BN-128 |
| Conv3-256 | BN-256 | BN-256 |
| Conv3-256 | BN-256 | BN-256 |
| Max pooling | — | — |
| Conv3-512 | BN-512 | IN-256, BN-256 |
| Conv3-512 | BN-512 | BN-512 |
| Conv3-512 | BN-512 | BN-512 |
| Max pooling | — | — |
| Conv3-512 | BN-512 | BN-512 |
| Conv3-512 | BN-512 | BN-512 |
| Conv3-512 | BN-512 | BN-512 |
| Max pooling | — | — |
| FC × 3 | — | — |

It can be seen from Table 1.2 that there are multiple implementation modes in the IBN-Net provided in the embodiment. Part of parameters may change if the following two conditions are met: first, IN processing is not performed in the last layer of the network (according to a requirement on a training result, the model may also be arranged in such a manner that IN processing is not performed in the last two or three layers, etc.); and second, IN and BN are used in combination or alternately in other layers (except the last layer). For example, by observing the four solutions, i.e., FIGS. 4(a), 4(b), 4(c) and 4(d), presented in FIG. 4, it can be seen that both the position of the IN layer and the number of the channels subjected to IN processing may be regulated. In addition, the four implementation solutions presented in FIG. 4 may be alternately adopted for different modules of the same CNN.

TABLE 1.3

ImageNet Validation Set-Based Error Rate Corresponding to Image Appearance Transform

| Appearance transform | ResNet50 top1/top5 err | IBN-Net50-a top1/top5 err | IBN-Net50-b top1/top5 err |
|---|---|---|---|
| Original image | 24.27/7.08 | 22.60/6.28 | 23.58/6.87 |
| RGB + 50 | 28.22/9.64 (3.94/2.56) | 25.61/7.96 (3.01/1.68) | 23.83/6.99 (0.25/0.12) |
| R + 50 | 27.53/8.78 (3.26/1.70) | 25.03/7.59 (2.43/1.31) | 25.09/7.36 (1.51/0.49) |
| contrast*1.5 | 40.01/19.08 (15.74/12.00) | 35.73/16.24 (13.13/9.96) | 23.64/6.87 (0.06/0.87) |
| Monet | 54.51/29.32 (30.24/22.24) | 51.62/27.15 (29.02/20.87) | 50.42/25.41 (26.84/18.54) |

In FIG. 4(a), IN processing and BN processing are performed on the feature map output by the first convolutional layer respectively, and then the results obtained by the two normalization processing manners are concatenated and output to the next layer, i.e., the ReLU. High generalization performance and high discriminative features of IN and BN are maintained, but more parameters may be introduced. The idea of retaining the two characteristics is also applied to the IBN-b, so that FIG. 4(b) is generated. In addition, the solutions presented in FIG. 4(a) and FIG. 4(b) may also be combined, as illustrated in FIGS. 4(c) and 4(d). Discussions about these variations will be made in the following experimental part. Table 1.3 illustrates top1 and top5-based error rates obtained by inputting the ImageNet as an image to be recognized into the IBN-Net model. Top1 means a probability that a most probable class that is predicted is correct. Top5 means a probability that a certain class in five most probable classes that are predicted is correct. Top1/top5 err represents top1-based or top5-based error rate. RGB+50 represents that based on the original image, 50 is added to three channels R, G and B of the image respectively. R+50 represents that 50 is added to the channel R, namely the image is redder. Contrast*1.5 represents that the contrast is multiplied by 1.5. Monet represents that the image is transformed to an image of a Monet style by use of CycleGAN (an image style transformation tool). Therefore, it can be seen from Table 1.3 that based on any appearance transform, the top1-based error rate and top5-based error rate obtained by the model IBN-Net50-a (i.e., FIG. 3(b)) are lower than top1-based error rate and top5-based error rate obtained by the original ResNet50 not adopting the IBN-Net respectively, and the top1-based error rate and top5-based error rate obtained by the model IBN-Net50-b (i.e., FIG. 3(c)) are lower than the top1-based error rate and top5-based error rate obtained by the original ResNet50 not adopting the IBN-Net respectively. Therefore, the performance of the neural network adopting the IBN-Net module is higher than the performance of the neural network not adopting the IBN-Net module (i.e., the original ResNet, as illustrated in FIG. 3(a)).

TABLE 2

Error Rates of IBN-Net over Other CNN Models on ImageNet Validation Set

| Model | Original model top1/top5 err. | re-implementation top1/top5 err. | IBN-Net-a model top1/top5 err. |
|---|---|---|---|
| VGG16 | 26.6/8.6 | 25.94/8.25 | 25.10/7.69(0.84/0.56) |
| ResNet50 | 24.7/7.8 | 24.27/7.08 | 22.60/6.32(1.67/0.75) |
| ResNet101 | 23.6/7.1 | 22.44/6.20 | 21.37/5.57(1.07/0.63) |
| ResNeXt101 | 21.2/5.6 | 21.31/5.70 | 20.75/5.32(0.56/0.38) |
| SE-ResNet101 | 22.38/6.07 | 21.68/5.88 | 20.99/5.49(0.69/0.39) |

For indicating performance of the IBN-Net model higher than the conventional CNN, the performance of the IBN-Net is compared with CNN architectures in the original ImageNet validation set in the embodiment. As illustrated in Table 2, the IBN-Net achieves consistent improvements of these CNNs, which presents higher model performance. Specifically, the IBN-ResNet101 is better than the ResNeXt101 and the SE-ResNet101, and the latter two require more time consumption or introduce additional parameters. However, in the IBN-Net model provided in the embodiment, no parameters may be additionally introduced, and only a small amount of calculation may be added in a test stage. Experimental results show that dropping out some average and variance statistics in the features may help the model in learning from the images with high appearance diversity.

TABLE 3

Error Rates of Variations of IBN-Net on ImageNet Validation Set and Monet Image

| Model | Original model top1/top5 err. | Monet top1/top5 err. |
|---|---|---|
| ResNet50 | 24.26/7.08 | 54.51/29.32(30.24/22.24) |
| IBN-Net50-a | 22.60/6032 | 51.62/27.15(29.02/20.83) |
| IBN-Net50-b | 23.58/6.87 | 50.42/25.41(26.84/18.54) |
| IBN-Net50-c | 22.78/6.32 | 51.83/27.09(29.05/20.77) |
| IBN-Net50-d | 22.86/6.48 | 50.80/26.16(27.94/19.68) |
| IBN-Net50-a&d | 22.89/6.48 | 51.27/26.64(28.38/20.16) |
| IBN-Net50-a*2 | 22.81/6.46 | 51.95/26.98(29.14/20.52) |

Other variations of the IBN-Net are further researched in the embodiment. Table 3 illustrates results of the IBN-Net variations described in the method part. All the IBN-Net variations provided in the embodiment present performance higher than that of the original ResNet50, and the performance is reduced less under appearance transform. Specifically, the IBN-Net-c has performance similar to that of the IBN-Net-a, and provides another feature combination method. The performance and generalization capability of the IBN-Net-d are between the IBN-Net-a and the IBN-Net-b, and this shows that retaining some BN features in part of channels corresponding to the feature map output by the convolutional layer is helpful for improving the performance but may reduce the generalization capability to a certain extent at the same time. The combination of the IBN-Net-a and the IBN-Net-b is substantially equivalent to the IBN-Net-d, and this shows that IN mainly influences a main path of the ResNet. Finally, adding additional IBN layers to IBN-Net-a brings no good, a moderate amount of IN layers would suffice.

TABLE 4

Error Rates Corresponding to IBN-Net50-a with IN Layers added to Different Residual Groups

| Residual group | Not add IN | 1 | 1-2 | 1-3 | 1-4 |
|---|---|---|---|---|---|
| top1 err. | 24.27 | 23.58 | 22.94 | 22.60 | 22.96 |
| top5 err. | 7.08 | 6.72 | 6.40 | 6.28 | 6.49 |

TABLE 5

Influence of Different Proportions of IN in IBN Layers on Error Rate

| Proportion of IN | 0 | 0.25 | 0.5 | 0.75 | 1 | All BN |
|---|---|---|---|---|---|---|
| top 1 err. | 24.27 | 22.49 | 22.60 | 23.11 | 23.44 | 28.56 |
| top 5 err. | 7.08 | 6.39 | 6.28 | 6.57 | 6.94 | 9.83 |

In the embodiment, IBN networks added with different numbers of IN layers are researched. Table 4 illustrates the performance of the IBN-Net50-a, where IN layers are added to different numbers of residual groups. It can be seen that along with addition of more IN layers into the shallow layers, the performance is improved, but when IN layers are added to the final residual group, the performance is reduced. This shows that applying IN to the shallow layer is helpful for improving the performance of the model, and BN is required to be adopted in the deep layer to retain important content information. In addition, the influence of an IN-BN ratio on the performance is further researched in the embodiment. As illustrated in Table 5, when the proportion of IN is 0.25 to 0.5, the top1-based error rate and the top5-based error rate are lowest respectively, and this shows the trade-off relationship between IN and BN in the using process.

TABLE 6

Result Based on Cityscapes-GTA Dataset

| Image library for training | Image library for testing | model | mIoU (%) | Pixel Acc.(%) |
|---|---|---|---|---|
| Cityscapes | Cityscapes | ResNet50 | 64.5 | 93.4 |
| | | IBN-Net50-a | 69.1 | 94.4 |
| | | IBN-Net50-b | 67.0 | 94.3 |
| | GTA5 | ResNet50 | 29.4 | 71.9 |
| | | IBN-Net50-a | 34.2 | 73.3 |
| | | IBN-Net50-b | 38.0 | 78.8 |
| GTA5 | GTA5 | ResNet50 | 63.0 | 92.1 |
| | | IBN-Net50-a | 65.0 | 92.4 |
| | | IBN-Net50-b | 63.8 | 92.4 |
| | Cityscapes | ResNet50 | 22.4 | 54.6 |
| | | IBN-Net50-a | 28.1 | 66.0 |
| | | IBN-Net50-b | 30.0 | 67.5 |

In the embodiment, the REsNet50 adopting hole convolution is used as the base, and the IBN-Net follows the same modification. The model is trained on each dataset, and the IBN-Net and the ResNet50 are evaluated, evaluation results are illustrated in Table 6. In Table 6, mIoU (%) represents Mean Intersection over Union (mIoU). The experimental results in the embodiment are consistent with the results in the ImageNet dataset. The IBN-Net presents higher model performance in a dataset and has higher generalization capability cross datasets of different domains. Specifically, the IBN-Net-a presents higher model performance, and on two datasets, the accuracy of the IBN-Net-a is 4.6% and 2.0% higher than the ResNet50. When cross evaluation is performed, the IBN-Net-b is better in generalization, and compared with the original ResNet50, the IBN-Net-b improves the performance from Cityscapes to Grand Theft Auto V (GTA5) by 8.6% and improves the performance from GTA5 to Cityscapes by 7.6%. It is important to note that the IBN-Net provided in the embodiment is different from domain adaptation works. Domain adaptation is oriented to the target domain and requires the data of the target domain during training, which is not required by the method provided in the embodiment of the disclosure. Nevertheless, the performance gain of the method of the embodiment of the disclosure is still equivalent to the performance gain of the domain adaptation method, and the method of the embodiment of the disclosure makes an important step to a more general model because the model is not forced to be adapted to a specific data domain but built-in appearance invariance is introduced to the model in the embodiment of the disclosure.

TABLE 7

Performance Improved by fine-tuning with Different Data Percentages

| fine-tune the proportion of the data | 10 | 20 | 30 | 100 |
|---|---|---|---|---|
| ResNet50 | 52.7 | 54.2 | 58.7 | 63.84 |
| BN-Net50-a | 56.5 | 60.5 | 65.5 | — |

Another common method for application of the model to a new data domain is to fine-tune the model by use of a small number of target domain annotations. The model provided in the embodiment of the disclosure has higher generalization capability, and thus the data required by the network may be remarkably reduced. In the embodiment, the model pretrained on the dataset of GTA5 is fine-tuned by use of different numbers of Cityscapes data and annotations. The initial learning rate and number of epochs are set to be 0.003 and 80 respectively. As illustrated in Table 7, under the condition that only 30% of the training data of Cityscapes is adopted, the performance of the IBN-Net50-a is higher than performance of the ResNet50 adopting all the training data.

For conveniently understanding how the IBN-Net of the embodiments of the disclosure implements better generalization, feature divergence caused by a domain bias is analyzed herein. The feature divergence is as follows. For an output feature of a certain layer in the CNN, an average of a channel is represented as F, F substantially describes how much the channel is activated, and if it is hypothesized that F is a Gaussian distribution of which the average is $\mu$ and the variance is $\sigma^2$, a symmetric KL divergence of the channel between a domain A and domain B may be represented as follows:

$$D(F_A \| F_B)| = KL(F_A \| F_B) + KL(F_B \| F_A), \text{ and} \quad (1)$$

$$KL(F_A \| F_B) = \log \frac{\sigma_A}{\sigma_B} + \frac{\sigma_A^2 + (\mu_A - \mu_B)^2}{2\mu_B^2} - \frac{1}{2}. \quad (2)$$

Where $D(F_{iA}||F_{iB})$ represents a symmetric KL divergence of the $i^{th}$ channel Symmetric KL divergences of all the channels of the feature of the layer may be averaged to obtain a metric of a feature difference of the domain A and domain B on the layer, an expression thereof is:

$$D(L_A || L_B) = \frac{1}{C}\sum_{i=1}^{C} D(F_{iA} || F_{iB}). \quad (3)$$

In the formula (3), C is the number of the channels in the layer, and the metric provides a measurement of a distance between feature distribution for the domain A and feature distribution for the domain B.

For capturing the influence of IN on the appearance information and the content information, three groups of domains are considered herein. The first two groups are Cityscapes-GTA5 and original image-Monet image (Photo-Monet), and the first two groups of domains have obvious appearance differences. For constructing two domains with different contents, an ImageNet-1k validation set is divided into two parts: the first part includes the image with 500 object categories, and the second part includes other 500 categories. Then, feature divergences for output features of 17 ReLU layers on main paths of the ResNet50 and the IBN-Net50 are calculated. An experiment is made on the three groups of images to obtain the following experimental results: in the IBN-Net, the feature divergence caused by the different image appearances is obviously reduced; for the IBN-Net-a, the divergence is moderately reduced; and for the IBN-Net-b, the divergence is suddenly reduced after the second, fourth and eighth IN layers, and this effect is maintained to the deep layers, which means that differences caused by the appearances in the deep features are reduced and thus interference to classification is reduced. On the other hand, since the feature divergence caused by content differences is not reduced in the IBN-Net, which indicates that the content information in the features is retained well in the BN layers. In the IBN-Net proposed in the embodiment, IN and BN are applied to a single deep network layer to improve the performance and generalization capability of the neural network. In the embodiment, the IBN-Net achieves consistent improvement over a number of classic CNNs including the VGG, the ResNet, the ResNeXt and the SENet on the ImageNet dataset. In addition, even though no data of the target domain is used, the cross-image-domain generalization capability of the neural network model may be improved by the built-in appearance invariance introduced by IN. Therefore, the functions of the IN and BN layers in the CNNs are summarized as follows: IN introduces the appearance invariance and improves the generalization capability, and BN retains the content information in the discriminative features.

Figure 5:
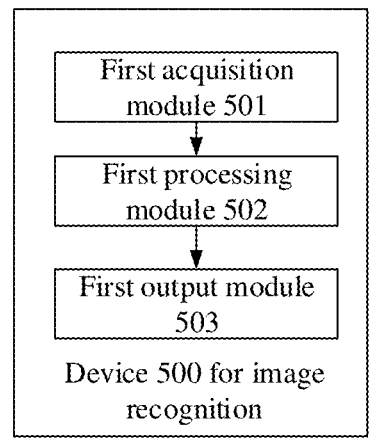
FIG. 5 is a composition structure diagram of a device for image recognition according to an embodiment of the disclosure.

The embodiments of the disclosure provide a device for image recognition. FIG. 5 is a composition structure diagram of a device for image recognition according to an embodiment of the disclosure. As illustrated in FIG. 5, the device 500 includes a first acquisition module 501, a first processing module 502 and a first output module 503. The first acquisition module 501 is configured to acquire an image to be recognized. The first processing module 502 is configured to input the image to be recognized into a neural network model obtained through training to obtain a recognition result of the image to be recognized, here, the neural network model is obtained by performing IN and BN processing on a neural network. The first output module 503 is configured to output the recognition result of the image to be recognized.

In some embodiments, the device 500 further includes a second processing module, configured to perform the IN and BN processing on feature maps output by convolutional layers in the neural network to obtain the neural network model.

In some embodiments, the second processing module includes: a first determination module, configured to determine a first convolutional layer set and a second convolutional layer set from the convolutional layers in the neural network; a first processing sub-module, configured to perform IN processing on a feature map output by each convolutional layer in the first convolutional layer set; and a second processing sub-module, configured to perform BN processing on a feature map output by each convolutional layer in the second convolutional layer set.

In some embodiments, a set formed by the first convolutional layer set and the second convolutional layer set includes all or part of the convolutional layers in the neural network. In the embodiment of the disclosure, the first convolutional layer set and the second convolutional layer set are disjoint, or, the first convolutional layer set and the second convolutional layer set are intersected, or, the second convolutional layer set is a subset of the first convolutional layer set.

In some embodiments, the first processing sub-module includes: a first determination sub-module, configured to determine a first channel set from channels corresponding to the feature map output by each convolutional layer in the first convolutional layer set; and a third processing sub-module, configured to perform the IN processing on the first channel set.

In some embodiments, the second processing sub-module includes: a second determination sub-unit, configured to determine a second channel set from channels corresponding to the feature map output by each convolutional layer; and a fourth processing sub-module, configured to perform the BN processing on the second channel set.

In some embodiments, the first channel set includes all or part of the channels corresponding to the feature map output by each convolutional layer in the first convolutional layer set, and the second channel set includes all or part of the channels corresponding to the feature map output by each convolutional layer in the second convolutional layer set.

In some embodiments, the device further includes the second processing module.

The second processing module is configured to sum feature maps corresponding to two blocks of the neural network to obtain an output result and perform IN processing on the output result, here, the neural network includes at least two blocks and a number of channels corresponding to a feature map output by a last layer in each block is the same as a number of channels corresponding to a feature map output by a last layer in a previous block.

It is to be noted that descriptions about the above device embodiments are similar to descriptions about the method embodiments and beneficial effects similar to those of the method embodiments are achieved. Technical details undisclosed in the device embodiments of the disclosure may be understood with reference to the descriptions about the method embodiments of the disclosure. It is to be noted that in the embodiments of the disclosure, when being implemented in form of software function module and sold or used as an independent product, the method for image recognition may also be stored in a computer-readable storage medium. Based on such an understanding, the technical solutions of the embodiments of the disclosure substantially or parts making contributions to the related arts may be embodied in form of software product, and the computer software product is stored in a storage medium, including a plurality of instructions configured to enable an instant messaging device (which may be a terminal and a server, etc.) to execute all or part of the method in each embodiment of the disclosure. The storage medium includes various media capable of storing program codes, such as a U disk, a mobile hard disk, a Read Only Memory (ROM), a magnetic disk or an optical disk. Therefore, the embodiments of the disclosure are not limited to any specific hardware and software combination.

Figure 6:
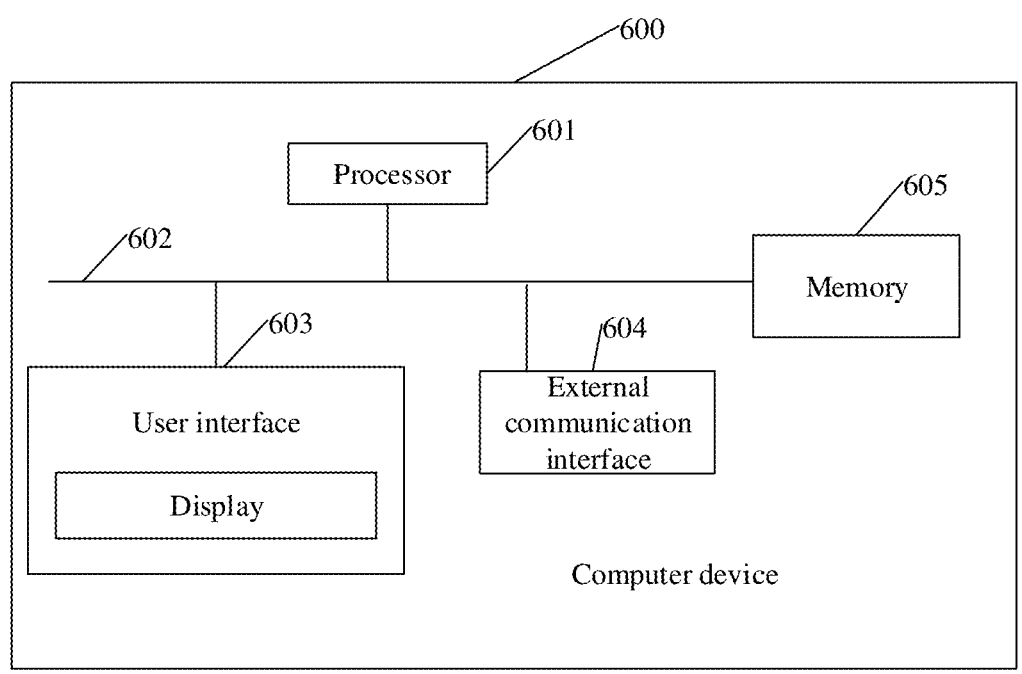
FIG. 6 is a composition structure diagram of a computer device according to an embodiment of the disclosure.

Correspondingly, the embodiments of the disclosure also provide a computer program product, which may include computer-executable instructions that, when executed, implement the method for image recognition provided in the embodiments of the disclosure. Correspondingly, the embodiments of the disclosure also provide a computer storage medium, having stored thereon computer-executable instructions that, when executed by a processor, cause the processor to implement the method for image recognition provided in the abovementioned embodiments. Correspondingly, the embodiments of the disclosure provide a computer device. FIG. 6 is a composition structure diagram of a computer device according to an embodiment of the disclosure. As illustrated in FIG. 6, the device 600 includes a processor 601, at least one communication bus 602, a user interface 603, at least one external communication interface 604 and a memory 605. The communication bus 602 is configured to implement connections and communications between these components. The user interface 603 may include a display, and the external communication interface 604 may include a standard wired interface and wireless interface. The processor 601 is configured to execute pathologic image recognition programs stored in the memory to implement the method for image recognition provided in the abovementioned embodiments.

The above descriptions about the computer device and storage medium embodiments are similar to descriptions about the method embodiments and beneficial effects similar to those of the method embodiments are achieved. Technical details undisclosed in the instant communication device and storage medium embodiments of the disclosure may be understood with reference to the descriptions about the method embodiments of the disclosure. It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure. The sequence numbers of the embodiments of the disclosure are adopted not to represent superiority-inferiority of the embodiments but for description. It is to be noted that terms "include", "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an" does not exclude existence of the same other elements in a process, method, object or device including the element.

In some embodiments provided by the disclosure, it is to be understood that the disclosed device and method may be implemented in another manner. The device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the devices or the units, and may be electrical, mechanical or adopt other forms.

The units described as separate parts may or may not be physically separated, and parts displayed as units may or may not be physical units, namely may be located in the same place, or may also be distributed to multiple network units. Part of all of the units may be selected according to a practical requirement to achieve the purposes of the solutions of the embodiments. In addition, each functional unit in each embodiment of the disclosure may be integrated into a processing unit, each unit may also serve as an independent unit and two or more than two units may also be integrated into a unit. The integrated unit may be implemented in a hardware form or may also be implemented in form of hardware and software functional unit.

Those of ordinary skill in the art should know that all or part of the operations of the method embodiments may be implemented by related hardware instructed through a program, the program may be stored in a computer-readable storage medium, and the program is executed to execute the operations of the method embodiments. The storage medium includes various media capable of storing program codes, such as a mobile storage device, a ROM, a magnetic disk or a compact disc.

Or, when being implemented in form of software functional module and sold or used as an independent product, the integrated unit of the disclosure may also be stored in a computer-readable storage medium. Based on such an understanding, the technical solutions of the embodiments of the disclosure substantially or parts making contributions to the related arts may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes, such as a mobile hard disk, a ROM, a magnetic disk or a compact disc.

The above is only the specific implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for image recognition, comprising:
acquiring an image to be recognized;
performing, through convolutional layers in a neural network model, feature extraction processing on the image to be recognized, to obtain feature maps;
performing Instance Normalization (IN) processing on a first channel set comprising part of channels corresponding to feature maps output by each convolutional layer in a first convolutional layer set and performing Batch Normalization (BN) processing on a second channel set comprising part of channels corresponding to feature maps output by each convolutional layer in a second convolutional layer set, to obtain a recognition result of the image to be recognized, wherein the first convolutional layer set and the second convolutional layer set are selected from the convolutional layers in the neural network model, and channels comprised in the first channel set are different from channels comprised in the second channel set; and
outputting the recognition result of the image to be recognized.

2. The method of claim 1, wherein a training process of the neural network model comprises:
determining the first convolutional layer set and the second convolutional layer set from the convolutional layers in a neural network model;
performing IN processing on the feature maps output by each convolutional layer in the first convolutional layer set; and
performing BN processing on the feature maps output by each convolutional layer in the second convolutional layer set.

3. The method of claim 2, wherein a set formed by the first convolutional layer set and the second convolutional layer set comprises all or part of the convolutional layers in the neural network model.

4. The method of claim 2, wherein the first convolutional layer set is disjointed from the second convolutional layer set, or, the first convolutional layer set is intersected with the second convolutional layer set, or, the second convolutional layer set is a subset of the first convolutional layer set.

5. The method of claim 2, wherein performing the IN processing on the feature maps output by each convolutional layer in the first convolutional layer set comprises:
determining the first channel set from the channels corresponding to the feature maps output by each convolutional layer in the first convolutional layer set; and
performing the IN processing on the first channel set.

6. The method of claim 2, wherein performing the BN processing on the feature maps output by each convolutional layer in the second convolutional layer set comprises:
determining the second channel set from the channels corresponding to the feature maps output by each convolutional layer in the second convolutional layer set; and
performing the BN processing on the second channel set.

7. The method of claim 2, wherein the first convolutional layer set does not comprise a last convolutional layer of the neural network model.

8. The method of claim 2, wherein the neural network model comprises at least two blocks, a number of channels corresponding to feature maps output by a last layer in each block is the same as a number of channels corresponding to feature maps output by a last layer in a previous block, and the method further comprises:
summing feature maps corresponding to the at least two blocks of the neural network model to obtain an output result; and
performing IN processing on the output result.

9. A computer device, comprising a memory and a processor, wherein the memory is configured to store computer-executable instructions and the processor is configured to run the computer-executable instructions in the memory to implement a method for image recognition comprising:
acquiring an image to be recognized;
performing, through convolutional layers in a neural network model, feature extraction processing on the image to be recognized, to obtain feature maps;
performing Instance Normalization (IN) processing on a first channel set comprising part of channels corresponding to feature maps output by each convolutional layer in a first convolutional layer set and performing Batch Normalization (BN) processing on a second channel set comprising part of channels corresponding to feature maps output by each convolutional layer in a second convolutional layer set, to obtain a recognition result of the image to be recognized, wherein the first convolutional layer set and the second convolutional layer set are selected from the convolutional layers in the neural network model, and channels comprised in the first channel set are different from channels comprised in the second channel set; and
outputting the recognition result of the image to be recognized.

10. The computer device of claim 9, wherein a training process of the neural network model comprises:
determining the first convolutional layer set and the second convolutional layer set from the convolutional layers in a neural network model;
performing IN processing on the feature maps output by each convolutional layer in the first convolutional layer set; and
performing BN processing on the feature maps output by each convolutional layer in the second convolutional layer set.

11. The computer device of claim 10, wherein a set formed by the first convolutional layer set and the second convolutional layer set comprises all or part of the convolutional layers in the neural network model.

12. The computer device of claim 10, wherein the first convolutional layer set is disjointed from the second convolutional layer set, or, the first convolutional layer set is intersected with the second convolutional layer set, or, the second convolutional layer set is a subset of the first convolutional layer set.

13. The computer device of claim 10, wherein performing the IN processing on the feature maps output by each convolutional layer in the first convolutional layer set comprises:
determining the first channel set from the channels corresponding to the feature maps output by each convolutional layer in the first convolutional layer set; and
performing the IN processing on the first channel set.

14. The computer device of claim 10, wherein performing the BN processing on the feature maps output by each convolutional layer in the second convolutional layer set comprises:
  determining the second channel set from the channels corresponding to the feature maps output by each convolutional layer in the second convolutional layer set; and
  performing the BN processing on the second channel set.

15. The computer device of claim 10, wherein the first convolutional layer set does not comprise a last convolutional layer of the neural network model.

16. The computer device of claim 10, wherein the neural network model comprises at least two blocks, a number of channels corresponding to feature maps output by a last layer in each block is the same as a number of channels corresponding to feature maps output by a last layer in a previous block, and the method further comprises:
  summing feature maps corresponding to the at least two blocks of the neural network model to obtain an output result; and
  performing IN processing on the output result.

17. A non-transitory computer-readable storage medium, having stored thereon computer-executable instructions that, when executed by a processor, cause the processor to perform a method for image recognition comprising:
  acquiring an image to be recognized;
  performing, through convolutional layers in a neural network model, feature extraction processing on the image to be recognized, to obtain feature maps;
  performing Instance Normalization (IN) processing on a first channel set comprising part of channels corresponding to feature maps output by each convolutional layer in a first convolutional layer set and performing Batch Normalization (BN) processing on a second channel set comprising part of channels corresponding to feature maps output by each convolutional layer in a second convolutional layer set, to obtain a recognition result of the image to be recognized, wherein the first convolutional layer set and the second convolutional layer set are selected from the convolutional layers in the neural network model, and channels comprised in the first channel set are different from channels comprised in the second channel set; and
  outputting the recognition result of the image to be recognized.

* * * * *